United States Patent
Waldstädt

(10) Patent No.: US 7,513,821 B2
(45) Date of Patent: Apr. 7, 2009

(54) FILLING JOINT ARRANGEMENT FOR A FLOWABLE FILLING MEDIUM

(75) Inventor: Manfred Waldstädt, Frankfurt am Main (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 11/853,333

(22) Filed: Sep. 11, 2007

(65) Prior Publication Data

US 2008/0064314 A1     Mar. 13, 2008

(30) Foreign Application Priority Data

Sep. 11, 2006    (DE)  ........................ 10 2006 042 544

(51) Int. Cl.
*A22C 11/00*    (2006.01)
(52) U.S. Cl. ...................................................... 452/45
(58) Field of Classification Search ............. 452/21–26, 452/30–36, 46–48, 51; 285/118, 223, 383; 403/38, 39, 52, 56, 57, 58, 59, 72, 79
See application file for complete search history.

(56) References Cited

U.S. PATENT DOCUMENTS 3,971,101 A   *   7/1976   Townsend et al. .............. 452/48

(Continued)

FOREIGN PATENT DOCUMENTS

AT            183342 B      9/1955

(Continued)

OTHER PUBLICATIONS

EP07017792 Search Report.

*Primary Examiner*—Thomas Price
(74) *Attorney, Agent, or Firm*—Hahn Loeser & Parks LLP; Michael H. Minns

(57) ABSTRACT

A filling joint arrangement for a filling medium which is capable of flow, in particular for a sausage meat, including a first filling pipe portion with a first filling pipe axis and a second filling pipe portion with a second filling pipe axis, wherein the second filling pipe portion is reversibly pivotable from a filling position in which the second filling pipe axis is aligned with the first filling pipe axis into a tilted position in which the second filling pipe axis is out of alignment with the first filling pipe axis, and further including a joint device which is disposed in filling medium-tight relationship between the first and the second filling pipe portions and which has a first joint receiving portion connected in filling medium-tight relationship to the first filling pipe portion and which includes a joint intermediate portion which has a third filling pipe portion with a third filling pipe axis and which is held pivotably by the first joint receiving portion in such a way that it is reversibly pivotable from the filling position into a tilted position in which the third filling pipe axis is out of alignment with the first filling pipe axis. It is further provided that there is a second joint receiving portion which is connected in filling medium-tight relationship to the second filling pipe portion and which together with the second filling pipe portion is reversibly pivotable with respect to the joint intermediate portion out of the filling position by way of a tilted intermediate position in which at least the third filling pipe axis is out of alignment with the first filling pipe axis into a tilted end position in which the second filling pipe axis is out of alignment with the third filling pipe axis.

21 Claims, 4 Drawing Sheets

U.S. PATENT DOCUMENTS

| | | | |
|---|---|---|---|
| 4,142,273 A * | 3/1979 | Gay | 452/46 |
| 4,682,385 A * | 7/1987 | Kasai et al. | 452/51 |
| 5,046,764 A * | 9/1991 | Kimura et al. | 285/154.2 |
| 5,071,326 A * | 12/1991 | Wright et al. | 417/517 |
| 6,773,297 B2 * | 8/2004 | Komiya | 439/445 |
| 7,243,955 B2 * | 7/2007 | Krausz et al. | 285/236 |
| 2005/0053699 A1 | 3/2005 | Whittlesey et al. | |
| 2006/0105690 A1 | 5/2006 | Wince et al. | |
| 2007/0243805 A1 | 10/2007 | Kruse | |

FOREIGN PATENT DOCUMENTS

| | | |
|---|---|---|
| DE | 11 97 780 | 7/1965 |
| DE | 1 632 143 | 12/1970 |
| FR | 2 780 246 A | 12/1999 |
| FR | 2 807 922 A | 10/2001 |

* cited by examiner

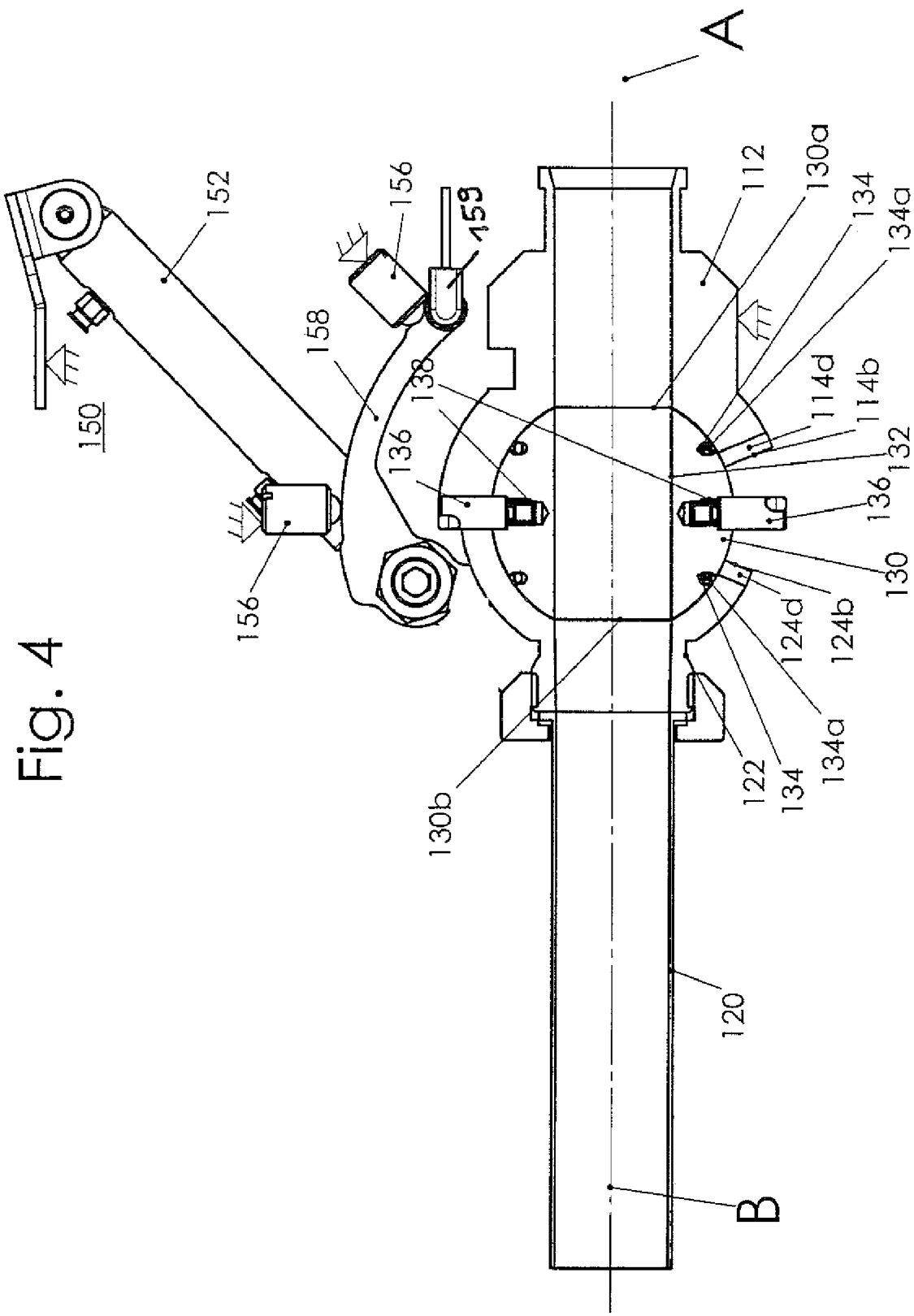

FILLING JOINT ARRANGEMENT FOR A FLOWABLE FILLING MEDIUM

BACKGROUND AND SUMMARY OF THE INVENTION

The invention concerns a filling joint arrangement for a filling medium which is capable of flow, in particular a sausage meat, and more particularly to a pivotable filling joint arrangement.

Disclosed is a filling joint arrangement which has a first filling pipe portion with a first filling pipe axis and a second filling pipe portion with a second filling pipe axis, wherein the second filling pipe portion is reversibly pivotable from a filling position in which the second filling pipe axis is aligned with the first filling pipe axis into a tilted position in which the second filling pipe axis is out of alignment with the first filling pipe axis. The filling arrangement further has a joint device which is disposed in filling medium-tight relationship between the first and the second filling pipe portions and which has a first joint receiving portion connected in filling medium-tight relationship to the first filling pipe portion and which includes a joint intermediate portion which has a third filling pipe portion with a third filling pipe axis and which is held pivotably by the first joint receiving portion in such a way that it is reversibly pivotable from the filling position into a tilted position in which the third filling pipe axis is out of alignment with the first filling pipe axis.

Figure 1:
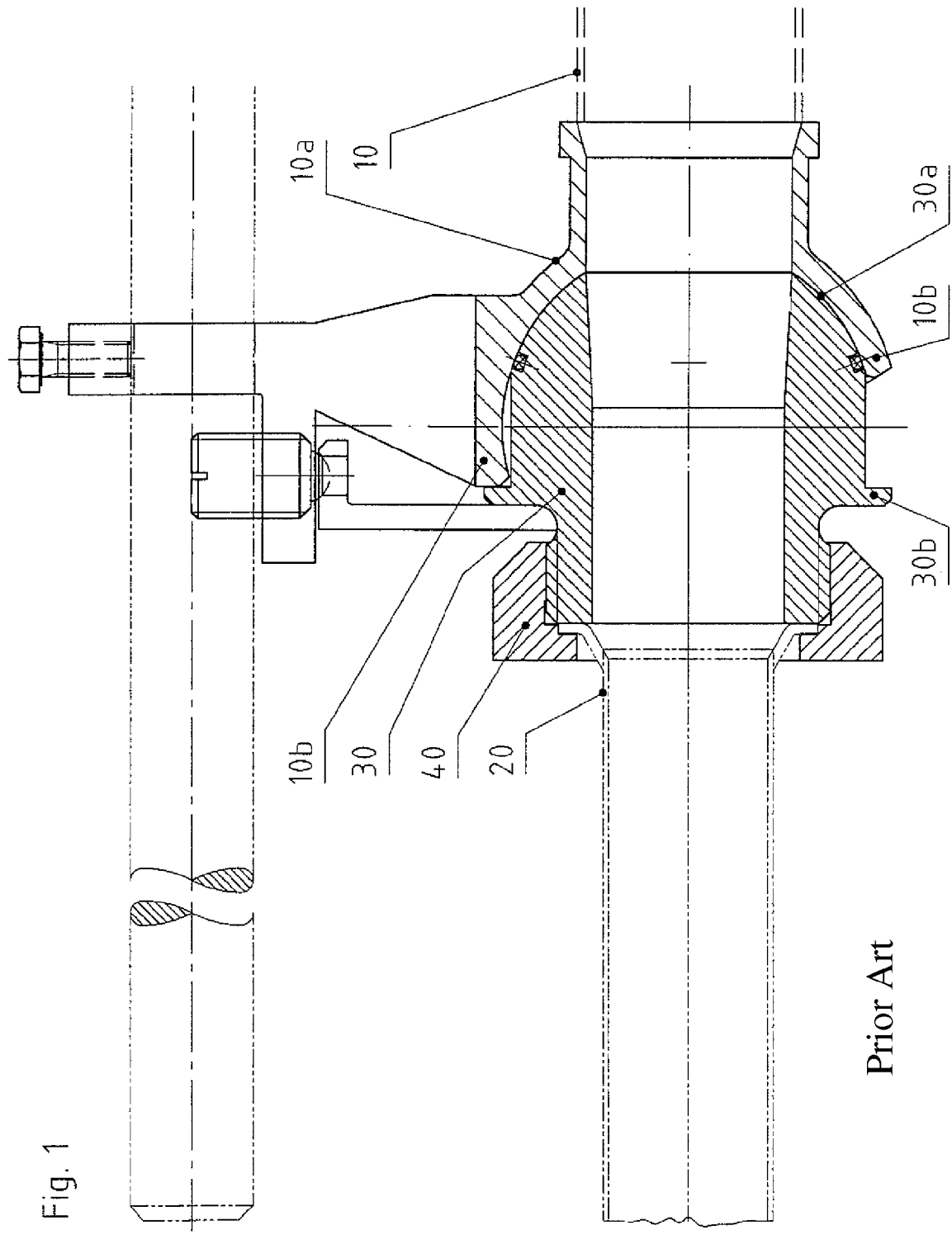

In practice, filling arrangements are known which include a joint device in order to be able to reversibly pivot a portion of a filling pipe, for example for pulling on fresh sausage skin portions or sausage skin parts in a concertinaed-together configuration, from a filling position into a tilted position. A known joint device of that kind is shown in FIG. 1. In that case the joint device has a first filling pipe portion 10 connected to a filling machine (not shown in greater detail). The assembly further has a second filling pipe portion 20 which is connected to a further machine provided downstream of the filling machine in the production direction, for example a packaging machine such as a sausage clip machine, which is also not shown in greater detail. The second filling pipe portion 20 is connected to the first filling pipe portion 10 by way of a third filling pipe portion 30 and can be pivoted reversibly with respect to the first filling pipe portion 10. The second filling pipe portion 10 is rigidly mounted to the third filling pipe portion 30 by means of a fixing element 40.

On the side towards the first filling pipe portion 10 the third filling pipe portion 30 has a hemispherical region 30a forming a joint intermediate portion. In the region of the axial center of the third filling pipe portion 30 it is provided with an abutment rim 30b which extends completely around it in a plane extending perpendicularly to the longitudinal center line of the third filling pipe portion 30. The hemispherical region 30a of the third filling pipe portion 30 is embraced by a part-spherical cup-shaped region 10a of the first filling pipe portion 10 which forms a first joint receiving portion, in such a way that it is arranged pivotably therein. At its end which faces towards the third filling pipe portion 30 the part-spherical cup-shaped region 10a of the first filling pipe portion 10 is also provided with an abutment rim 10b which in each case extends completely therearound over 180° in two planes, wherein the planes extend perpendicularly to the longitudinal center line of the first filling pipe portion 10 but include an angle to each other.

When the filling pipe portions 10, 20, 30 are in the filling position, that is to say, when the longitudinal center lines of the portions 10, 20, 30 are in mutually coaxially aligned relationship, the abutment rim 10b of the part-spherical cup-shaped region 10a of the first filling pipe portion 10, which extends over 180° in one of the two vertical planes, bears against the peripherally extending abutment rim 30b of the third filling pipe portion 30 while the abutment rim 10b of the first filling pipe portion 10, which extends over 180° in the other vertical plane, is spaced from the abutment rim 30b of the third filling pipe portion. In comparison, in the tilted position of the second and third filling pipe portions 20, 30 the abutment rim 10b of the first filling pipe portion 10, which is spaced in the filling position, bears against the abutment rim 30b of the third filling pipe portion 30.

As a certain degree of overlap of the two regions 30a, 10a which are hemispherical and part-spherical cup-shaped respectively, of the third and first filling pipe portions 30, 10 is necessary to provide a secure and medium-tight connection between the first filling pipe portion 10 and the third and second filling pipe portions 30 and 20 respectively, the known joint device suffers from the disadvantage that the pivotal angle is only comparatively slight. That affords a limited space for movement for pulling on sausage skin portions in a concertinaed-together configuration, particularly in the case of displacer members involving a large passage therethrough.

The present invention aims to overcome that disadvantage. A filling joint arrangement of the kind set forth in the opening part of this specification is provided that affords improved accessibility by virtue of a large pivotal angle.

By virtue of the provision of a second joint receiving portion which is connected in filling medium-tight relationship to the second filling pipe portion and which together with the second filling pipe portion is reversibly pivotable with respect to the joint intermediate portion out of the filling position by way of a tilted intermediate position in which at least the third filling pipe axis is out of alignment with the first filling pipe axis into a tilted end position in which the second filling pipe axis is out of alignment with the third filling pipe axis, it is possible for the second filling pipe portion to be pivoted with respect to the first filling pipe portion by approximately double the pivotal angle than was possible with previously known filling pipe joint arrangements, without sealing integrity and/or assembly between the filling pipe portions being adversely affected thereby. That configuration affords a markedly improved freedom of movement.

It is advantageous if the first joint receiving portion and/or the second joint receiving portion at least approximately have an internal contour in the form of a spherical cap and/or the joint an accurate and almost play-free guidance for the joint portions as well as an enlarged contact surface which imparts additional stability to the joint. In that respect it can be provided that the outside diameter of the first joint receiving portion is larger than the outside diameter of the second joint receiving portion.

Arranging the third filling pipe portion in the joint intermediate portion results in the formation of a respective flattened portion in the region of the mouth openings for the third filling pipe portion, the flattened portion facilitating pivotal movement of the joint intermediate portion with respect to the first and the second joint receiving portions.

A sealing device disposed on the joint intermediate portion in the region of the first and second joint receiving portions, for closing off the first and second joint receiving portions in filling medium-tight relationship, makes it possible to use sealing elements which are simple, or a sealing device of a simple configuration, which, when in a coaxial arrangement with respect to the axis of the third filling pipe portion, is disposed between the joint intermediate portion and the respective joint receiving portion. That achieves a high level of sealing effect. Furthermore the rim of the joint receiving portion does not slide beyond the sealing device, thereby providing for a further minimization of wear.

Any suitable configuration can be adopted for the sealing device. It is particularly advantageous if the sealing device is formed by at least one O-ring. The use of an O-ring makes it possible to compensate for minor unevenness and irregularities in the sealing region as such an O-ring is generally elastic, thereby providing for a reliable sealing effect. In addition, in contrast to fixedly inserted seals, it is easily replaceable when wear occurs. Replaceability is further simplified if the O-ring seal is arranged in a groove that extends peripherally in coaxial relationship with the third filling pipe portion.

It is further advantageous if the joint device has a first and a second abutment device whereby the filling position and the tilted end position are accurately defined. Those two positions are reached precisely when, in the filling position, the first abutment device comes into a position of abutment in relation to the first and second joint receiving portions and in the tilted end position the second abutment device comes into a position of abutment with respect to the first and second joint receiving portions so that incorrect positioning of the filling pipe can be almost excluded. It can further be provided that, when the tilted intermediate position is reached, the second abutment device comes to bear against the first joint receiving portion while when the tilted end position is reached, it can be brought into contact with the first and second joint receiving portions.

The abutment function is implemented in a simple and reliable fashion by the use of pins which form the first and/or the second abutment device and which project out of the joint intermediate portion.

In that respect, a substantially diametrally oppositely disposed arrangement of the first and second abutment devices on the joint intermediate portion and a substantially perpendicular orientation in respect of the longitudinal axes of the two abutment devices with respect to the third filling pipe axis of the third filling pipe portion of the joint intermediate portion affords a pivotal angle of approximately equal size in respect of the first filling pipe portion and the second filling pipe portion in relation to the joint intermediate portion, whereby, inter alia, the arrangement of the sealing elements on the joint intermediate portion can be symmetrical. It can be provided in that case that the longitudinal axes of the first and second abutment devices extend substantially perpendicularly to the third filling pipe axis of the third filling pipe portion of the joint intermediate portion.

If the first joint receiving portion and the second joint receiving portion each have a respective opening for receiving the first and second abutment devices, that ensures precise abutment and additional guidance and stability is afforded in the event of wear phenomena at the joint pivot point.

It is further advantageous if the first joint receiving portion and the second joint receiving portion each have a respective rim, wherein the two rims respectively have a first rim portion peripherally extending preferably through 180° in first planes and a second rim portion peripherally extending preferably over 180° in second planes, wherein the two first rim portions and the two second rim portions are respectively disposed in mutually opposite relationship and wherein in the filling position the two first planes of the two first rim portions extend at least approximately parallel to each other and the two second planes of the second rim portions include an angle to each other. In the case of such a structure for the two joint receiving portions the surface of the joint intermediate portion, which is embraced by the joint receiving portions, is increased to a maximum, whereby guidance for the joint portions is improved and stabilized.

The angle which the two second planes of the second rim portions form corresponds in that case to the total pivotal angle of the second filling pipe portion with respect to the first filling pipe portion, which can be very accurately selected by the appropriate configuration of the joint receiving portions.

In addition there can be provided a rotary joint, the rotary joint axis of which preferably extends substantially perpendicularly to the third filling pipe axis of the third filling pipe portion. That provides for a maximum angle of pivotal deflection movement, in interaction with the correspondingly arranged first and second abutment devices and the first and second rim portions.

A holding device which is provided on the filling arrangement and which supports the second filling pipe portion and/or the joint intermediate portion and/or pivots relative to the first filling pipe portion imparts the necessary stability to the filling arrangement and permits pivotal deflection movement of the second filling pipe portion by machine, from the filling position into the tilted end position.

It is also to be noted that the joint device which has been described hereinbefore in respect of its basic principles and its advantageous configurations can be used not only in relation to a filling apparatus but also in relation to other apparatuses. Therefore the joint device can also represent an independent invention.

Further advantageous configurations and an embodiment by way of example are described in greater detail hereinafter in connection with the specific description in conjunction with the accompanying Figures. The terms 'up', 'down', 'left' and 'right' used in the description of the specific embodiment relate to the drawings in an orientation with the Figure identifications and reference numerals being normally readable.

BRIEF DESCRIPTION OF THE DRAWING FIGURES

Figure 2:
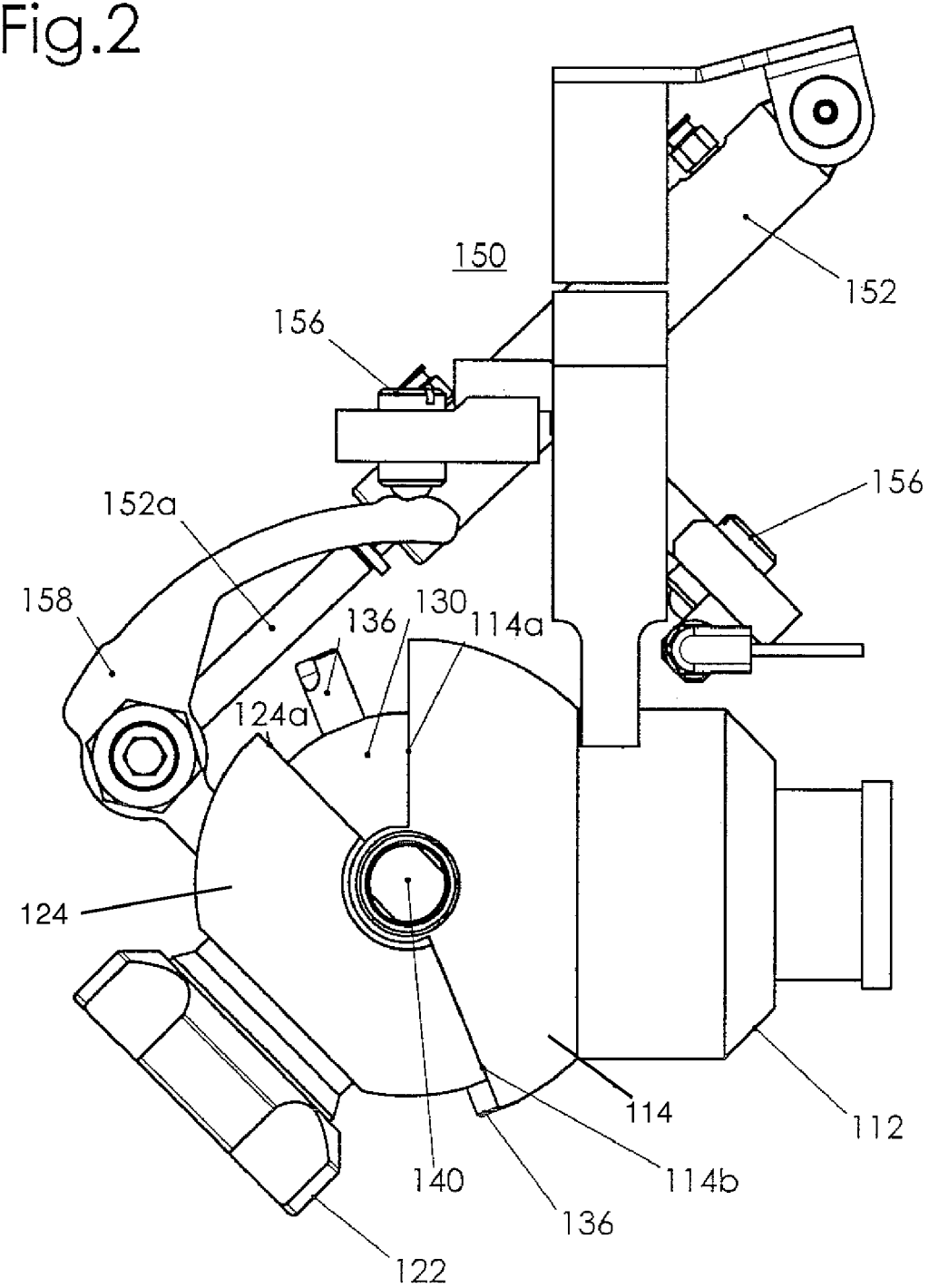
Figure 3:
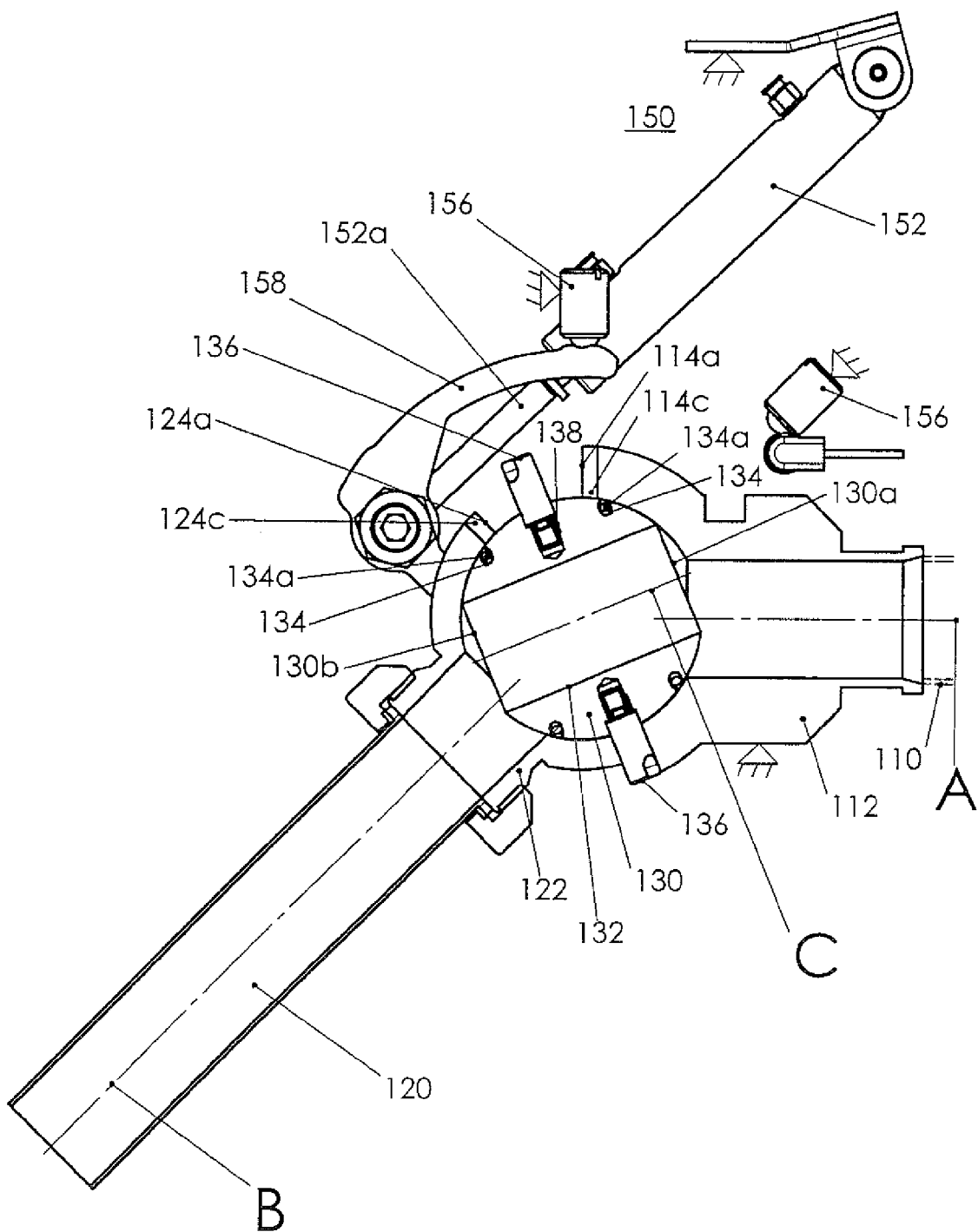

FIG. 1 shows a view in section perpendicularly to the plane of pivotal movement through a filling apparatus according to the state of the art with a known joint arrangement, FIG. 2 shows a side view in the plane of pivotal movement of a filling joint arrangement according to the invention with a joint device in a tilted position, FIG. 3 shows a view in section in the plane of pivotal movement through a filling joint arrangement according to the invention with the joint device in a tilted position, and FIG. 4 shows a view in section in the plane of pivotal movement through a filling joint arrangement according to the invention with the joint device in the filling position.

DETAILED DESCRIPTION

FIGS. 2 through 4 show a filling joint arrangement according to the invention. The filling joint arrangement includes a first filling pipe portion 110 of preferably stainless steel, which is connected to a filling machine (not shown). The structure further includes a second filling pipe portion 120 also preferably of stainless steel, which is connected to a packaging machine such as a sausage clipping machine (also not shown) which is arranged downstream of the filling machine in the production direction. The first and second filling pipe portions 110, 120 are each of a cross-section in the form of a circular ring with a respective longitudinal center line A, B which extend in mutually coaxial relationship in the filling position of the filling pipe portions 110, 120 (see FIG. 4).

At the end of the first filling pipe portion 110, which faces towards the second filling pipe portion 120, a first joint receiving portion 112 is arranged thereon while a second joint receiving portion 122 is arranged at the end of the second filling pipe portion 120, which faces towards the first filling pipe portion 110. The two joint receiving portions 112, 122 are each mounted rigidly but dismantleably to the respective filling pipe portion 110, 120, for example by way of a screw-threaded engagement. The two joint receiving portions 110, 120 are each in the form of a spherical cap in respect of their external and internal contours, wherein their outside diameter in each case is larger than the outside diameter of the first and the second filling pipe portions 110, 120 respectively and the outside diameter of the first joint receiving portion 112 is larger than the outside diameter of the second joint receiving portion 122. The internal contours of the two joint receiving portions 112, 122, in particular the spherical caps, are at least approximately the same.

At its end facing towards the second joint receiving portion 122 the first joint receiving portion 112 has a first abutment device 114 having first and second abutment rim portions 114a, 114b. The two abutment rim portions 114a, 114b each extend in the peripheral direction of the first joint receiving portion 112 over at least approximately 180° in two planes which extend perpendicularly to the longitudinal center line A of the first filling pipe portion 110 but which include an angle with each other, as can be seen from FIGS. 2 through 4.

Equally, at its end facing towards the first joint receiving portion 112, the second joint receiving portion 122 has a second abutment device 124 including a first and a second abutment rim portion 124a, 124b. The two abutment rim portions 124a, 124b each extend in the peripheral direction of the second joint receiving portion 122 over at least approximately 180° in two planes which extend perpendicularly to the longitudinal center line B of the second filling pipe portion 120, but include an angle with each other, as can be seen from FIGS. 2 through 4. At two locations which are disposed in opposite relationship at least approximately over 180° the first and the second abutment rim portions 114a, 114b of the first joint receiving portion 112 and the first and second abutment rim portions 124a, 124b of the second joint receiving portion 122 are provided with an at least approximately semicylindrical opening 114c, 114d and 124c, 124d respectively, the purpose of which will be described in greater detail hereinafter.

A joint intermediate portion 130 which preferably also comprises stainless steel is provided between the first and second filling pipe portions 110, 120, in particular between the first and second joint receiving portions 112, 122. The joint intermediate portion 130 involves an external contour in the form of a sphere with two at least approximately diametrally oppositely disposed flat portions 130a, 130b. The two flat portions 130a, 130b are formed by a pipe portion 132 which extends in the interior of the joint intermediate portion 130 linearly along its longitudinal center line C. The inside diameter of the pipe portion 132 which forms a third filling pipe portion corresponds in that case at least approximately to the inside diameter of the first and the second filling pipe portions 110, 120. Furthermore the outside diameter of the spherical joint intermediate portion 130 at least approximately corresponds to the inside diameter of the two joint receiving portions 112, 122, in the form of a spherical cap, of the first and second filling pipe portions 110, 120.

Two grooves 134 which extend through 360° completely and in coaxial relationship with the longitudinal center line C of the joint intermediate portion 130 are provided spaced at least approximately uniformly from the two flat portions 130a, 130b and the center point of the spherical joint intermediate portion 130. A respective O-ring 134a is fitted into each of the two grooves. The two O-rings 134a form a medium-tight seal between the outside peripheral surface of the joint intermediate portion 130 and the inside peripheral surfaces of the two joint receiving portions 112, 122.

Furthermore, in a plane extending perpendicularly to its longitudinal center line C, the joint intermediate portion 130 is provided with two diametrally mutually oppositely disposed screw-threaded pins 136 which are preferably produced from steel. The two cylindrical screw-threaded pins 136 which are of the same outside diameter are screwed into two blind bores 138, with their respective screw-threaded portion (not identified in greater detail) in such a way that they project equally far beyond the outside peripheral surface of the joint intermediate portion 130. The two screw-threaded pins 136 serve as first and second abutment devices. In that respect they come into contact with the semicylindrical openings 114c, 114d and 124c, 124d respectively of the first and second joint receiving portions 112, 122, as is described in greater detail hereinafter. Therefore the inside diameters of the semicylindrical openings 114c, 114d and 124c, 124d of the first and second joint receiving portions 112, 122 at least approximately correspond to the outside diameters of the screw-threaded pins 136.

A pivot axis 140 is further provided between the first and second joint receiving portions 112, 122. The pivot axis 140 extends both perpendicularly to the longitudinal center line C of the joint intermediate portion and also perpendicularly to the axis of the two screw-threaded pins 136 and also through the common point of intersection thereof.

In addition the filling arrangement according to the invention has a holding device 150 which serves for holding and pivoting of the joint receiving portions 112, 122 as well as for identifying the respective position of the second filling pipe portion 120. For that purpose the holding device 150 is provided with a hydraulic or pneumatic cylinder 152 which is pivotally connected with its piston rod 152a to the second joint receiving portion 122. The second joint receiving portion 122 with the second filling pipe portion 120 can be reversibly displaced from a filling position by way of a tilted intermediate position into a tilted end position, by extension and retraction of the piston rod 152a. Two latching pins 156 are provided for latching the holding device 150 at the two end positions.

Actuation of the filling joint arrangement according to the invention is effected as follows:

In the filling position as shown in FIG. 4 the longitudinal center lines A, B, C of the filling pipe portions 110, 120, 132 are in mutually coaxially aligned relationship. The piston rod 152a is retracted into the cylinder 152 to the maximum degree and a latching pin 156 is latched into an opening at the right-hand end of the control member 158 and thus marks the filling position. The first abutment rim portion 114a, 124a of the first and second abutment devices 114, 124 are in contact with each other and their cylindrical openings 114c, 124c embrace the screw-threaded pins 136 while the second abutment rim portions 114b, 124b of the first and second abutment devices 114, 124 are at the maximum spacing from each other and from the second screw-threaded pins 136. In that position the pipe portions 110, 120, 132 form a continuous pipe through which the filling material can be transported without any problem.

If now the second filling pipe portion 120 is to be pivoted out of the filling position the piston rod 152a is extended from the cylinder 152. It presses against the second joint receiving portion 122 whereby the second filling pipe portion 120 is inclined downwardly in the view shown in FIG. 4 as it is fixedly connected to the second joint receiving portion 122. It rotates about the rotary axis 140, wherein due to the configuration in the form of a spherical cap and due to the approximately spherical configuration of the joint intermediate portion 130, it slides therealong. In that case the first abutment rim portion 124a of the second abutment device 124 comes out of contact both with the first abutment rim portion 114a of the first abutment device 114 and also the pins 136. While that happens the second abutment rim portion 124b of the second abutment device 124 approaches the second pin 136 and embraces it with its cylindrical opening 124d.

The position reached in that fashion is referred to as the tilted intermediate position and is characterized in that the upper screw-threaded pin 136 is still in contact in the opening 114c of the first abutment rim portion 114a of the first abutment device 114 while the opening 124d of the second abutment rim portion 124b already embraces the lower pin 136. The center lines A, C of the first and third filling pipe portions 110, 132 are aligned while the center line B of the second filling pipe portion 120 is pivoted out of that alignment.

The second filling pipe portion 120 can be further pivoted out of the line of conveyor movement by further extension of the piston rod 152a out of the cylinder 152. As the second joint receiving portion 122 embraces the lower pin 136 with the cylindrical opening 124d of the second abutment rim portion 124b of the second abutment device 124, upon further pivotal movement of the second filling pipe portion 120 the joint intermediate portion 130 is now rotated about the rotary axis 140. When that happens the second abutment rim portion 124b of the second abutment device 124, together with the lower pin 136, approaches the second abutment rim portion 114b of the second abutment device 114 until they come into contact and the pin 136 is embraced by the two cylindrical openings 114d, 124d. While that happens the upper pin 136 moves out of the opening 114c of the first abutment rim portion 114a, in which case its spacing relative to the opening 124c of the first abutment rim portion 124a remains constant.

The position reached in that fashion is the tilted end position, shown in FIG. 3. In that position, the center line C of the third filling pipe portion 132 is also pivoted out of the alignment of the center line A of the first filling pipe portion 120. The angle between the center lines B, C of the second and third filling pipe portions 120, 132 has remained constant after the tilted intermediate position is reached. The pivotal angle of the second filling pipe portion 120 with respect to the first filling pipe portion 110 is now at a maximum. In that position, a new sausage casing portion of concertinaed-together configuration or a new sausage skin portion can be drawn on to the filling pipe.

The spherical configuration of the joint intermediate portion 130 makes it possible for the arrangement of the grooves 134, which extend in coaxial relationship around the joint intermediate portion 130, to be sealed by, for example, O-ring seals 134a. By virtue of the configuration in the form of a spherical cap of the first and second joint receiving portions 112, 122 they slide over the sealing devices 134a during the entire pivotal operation, without releasing them. That ensures an uninterrupted sealing integrity effect between the joint receiving portions 112, 122 and the joint intermediate portion 130.

Furthermore the opening at the right-hand end of the control member 158 leaves the right-hand latching pin 156 at the beginning of the pivoting operation, whereby the latter is released. When the tilted end position is reached the opening latches into the left-hand latching pin 156.

The procedures involved when the second filling pipe portion 120 is pivoted into the filling position again take place in accordance with the foregoing description of the pivotal deflection movement, in the reverse sequence. A sensor 159 indicates the end position.

Finally it is also to be noted that the invention is not restricted to the embodiment shown in FIGS. 2 through 4. By way of example sealing elements other than the above-mentioned O-ring seals can be used. Furthermore the drive means for producing the pivotal deflection movement can be other than the illustrated cylinder, for example a motor with a corresponding transmission assembly.

The invention claimed is:

1. A filling joint arrangement for a flowable filling medium which is capable of flow comprising:
   a first filling pipe portion with a first filling pipe axis; and
   a second filling pipe portion with a second filling pipe axis, wherein
   the second filling pipe portion is reversibly pivotable between a filling position where the second filling pipe axis is aligned with the first filling pipe axis and a tilted position where the second filling pipe axis is out of alignment with the first filling pipe axis;
   a joint device disposed in filling medium-tight relationship between the first and the second filling pipe portions comprising:
      a first joint receiving portion connected in filling medium-tight relationship to the first filling pipe portion;
      a joint intermediate portion having a third filling pipe portion with a third filling pipe axis and held pivotably by the first joint receiving portion in such a way that it is reversibly pivotable from the filling position into a tilted position in which the third filling pipe axis is out of alignment with the first filling pipe axis; and
      a second joint receiving portion connected in filling medium-tight relationship to the second filling pipe portion and which together with the second filling pipe portion is reversibly pivotable with respect to the joint intermediate portion between the filling position by way of a tilted intermediate position in which at least the third filling pipe axis is out of alignment with the first filling pipe axis and a tilted end position in which the second filling pipe axis is out of alignment with the third filling pipe axis,
   wherein the first filling pipe portion, the second filling pipe portion and the joint intermediate portion are reversibly pivotable about a common axis.

2. A filling joint arrangement as set forth in claim 1 where at least one of the first joint receiving portion and the second joint receiving portion at least approximately have an internal contour in the form of a spherical cap.

3. A filling joint arrangement as set forth in claim 2 where the outside diameter of the first joint receiving portion is larger than the outside diameter of the second joint receiving portion.

4. A filling joint arrangement as set forth in claim 2 where the joint intermediate portion at least approximately has an external contour in the form of a sphere.

5. A filling joint arrangement as set forth in claim 4 where the third filling pipe portion has apertures at ends thereof and the joint intermediate portion has a respective flattening in the region of the third filling pipe portion apertures.

6. A filling joint arrangement as set forth in claim 1, further comprising:
a rotary joint having a rotary joint axis extending substantially perpendicularly to the third filling pipe axis of the third filling pipe portion.

7. A filling joint arrangement as set forth in claim 1 further comprising:
a holding device supporting at least one of the second filling pipe portion and the joint intermediate portion, the holding device pivoting the at least one of the second filling pipe portion and the joint intermediate portion relative to the first filling pipe portion.

8. A filling joint arrangement for a flowable filling medium which is capable of flow comprising:
a first filling pipe portion with a first filling pipe axis; and
a second filling pipe portion with a second filling pipe axis, wherein
the second filling pipe portion is reversibly pivotable between a filling position where the second filling pipe axis is aligned with the first filling pipe axis and a tilted position where the second filling pipe axis is out of alignment with the first filling pipe axis;
a joint device disposed in filling medium-tight relationship between the first and the second filling pipe portions comprising:
a first joint receiving portion connected in filling medium-tight relationship to the first filling pipe portion;
a joint intermediate portion having a third filling pipe portion with a third filling pipe axis and held pivotably by the first joint receiving portion in such a way that it is reversibly pivotable from the filling position into a tilted position in which the third filling pipe axis is out of alignment with the first filling pipe axis; and
a second joint receiving portion connected in filling medium-tight relationship to the second filling pipe portion and which together with the second filling pipe portion is reversibly pivotable with respect to the joint intermediate portion between the filling position by way of a tilted intermediate position in which at least the third filling pipe axis is out of alignment with the first filling pipe axis and a tilted end position in which the second filling pipe axis is out of alignment with the third filling pipe axis,
at least one of the first joint receiving portion and the second joint receiving portion at least approximately have an internal contour in the form of a spherical cap,
the joint intermediate portion in the region of the first and second joint receiving portions has a sealing device for closing off the first and second joint receiving portions in filling medium-tight relationship.

9. A filling joint arrangement as set forth in claim 8 where the sealing device is arranged in peripherally extending relationship on the joint intermediate portion coaxially with respect to the filling pipe axis of the third filling pipe portion.

10. A filling joint arrangement as set forth in claim 9 where the sealing device is formed by an O-ring.

11. A filling joint arrangement as set forth in claim 8 where the joint device has a first and a second abutment device.

12. A filling joint arrangement as set forth in claim 11 where the first abutment device in the filling position contacts the first and second joint receiving portions and the second abutment device in the tilted end position contacts with the first and second joint receiving portions.

13. A filling joint arrangement as set forth in claim 11 where the second abutment device contacts the first joint receiving portion when the tilted intermediate position is reached and contacts the first and second joint receiving portions when the tilted end position is reached.

14. A filling joint arrangement as set forth in claim 13 where at least one of the first abutment device and the second abutment device includes pins which project out of the joint intermediate portion.

15. A filling joint arrangement as set forth in claim 14 where the first and second abutment devices are disposed in substantially diametrally opposite relationship on the joint intermediate portion.

16. A filling joint arrangement as set forth in claim 11 where the longitudinal axes of the first and second abutment devices extend substantially perpendicularly to the third filling pipe axis of the third filling pipe portion of the joint intermediate portion.

17. A filling joint arrangement as set forth in claim 11 where the first joint receiving portion and the second joint receiving portion each have a respective opening for receiving the first and second abutment devices.

18. A filling joint arrangement for a flowable filling medium which is capable of flow comprising:
a first filling pipe portion with a first filling pipe axis; and
a second filling pipe portion with a second filling pipe axis, wherein
the second filling pipe portion is reversibly pivotable between a filling position where the second filling pipe axis is aligned with the first filling pipe axis and a tilted position where the second filling pipe axis is out of alignment with the first filling pipe axis;
a joint device disposed in filling medium-tight relationship between the first and the second filling pipe portions comprising:
a first joint receiving portion connected in filling medium-tight relationship to the first filling pipe portion;
a joint intermediate portion having a third filling pipe portion with a third filling pipe axis and held pivotably by the first joint receiving portion in such a way that it is reversibly pivotable from the filling position into a tilted position in which the third filling pipe axis is out of alignment with the first filling pipe axis; and
a second joint receiving portion connected in filling medium-tight relationship to the second filling pipe portion and which together with the second filling pipe portion is reversibly pivotable with respect to the joint intermediate portion between the filling position by way of a tilted intermediate position in which at least the third filling pipe axis is out of alignment with the first filling pipe axis and a tilted end position in which the second filling pipe axis is out of alignment with the third filling pipe axis,
the first joint receiving portion and the second joint receiving portion each have a respective rim, the two rims each have a respective first rim portion extending through 180° in first planes and a respective second rim portion extending over 180° in second planes, the two first rim portions and the two second rim portions are respectively disposed in mutually opposite relationship and in the filling position the two first planes of the two first rim portions extend at least approximately parallel to each other and the two second planes of the second rim portions include an angle with each other.

19. A filling joint arrangement as set forth in claim 18 where the angle between the two second planes of the second rim portions defines the total pivotal angle of the second filling pipe portion with respect to the first filling pipe portion.

20. A filling joint arrangement for a filling medium which is capable of flow comprising:
- a first filling pipe portion with a first filling pipe axis; and
- a second filling pipe portion with a second filling pipe axis; and
- a joint device disposed in filling medium-tight relationship between the first and the second filling pipe portions comprising:
  - a first joint receiving portion connected in filling medium-tight relationship to the first filling pipe portion, the first joint receiving portion having a concave semi-spherical interior;
  - a second joint receiving portion connected in filling medium-tight relationship to the second filling pipe portion, the second joint receiving portion having a concave semi-spherical interior;
  - a joint intermediate spherical portion having a third filling pipe portion therethrough with a third filling pipe axis, the first joint receiving portion, the second joint receiving portion and the joint intermediate spherical portion pivoting about a common axis between a first position where the first filling pipe portion, the second filling pipe portion, the first joint receiving portion, the second joint receiving portion and the joint intermediate spherical portion are in fluid communication with one another forming a continuous pipe therethrough and a second position where the first filling pipe portion, the second filling pipe portion, the first joint receiving portion, the second joint receiving portion and the joint intermediate spherical portion are not in fluid communication therethrough.

21. A filling joint arrangement as set forth in claim 20 where the third filling pipe portion has apertures at ends thereof and the joint intermediate spherical portion has a respective flattening in the region of the third filling pipe portion apertures.

* * * * *